US012657438B2

(12) United States Patent
Krishna et al.

(10) Patent No.: US 12,657,438 B2
(45) Date of Patent: Jun. 16, 2026

(54) TECHNIQUES FOR USING MULTIPLE NEURAL AUTOREGRESSIVE FLOW MODEL LAYERS TO GENERATE A MODEL FOR TIMESERIES DATA FORECASTING

(71) Applicant: Microsoft Technology Licensing, LLC, Redmond, WA (US)

(72) Inventors: Chepuri Shri Krishna, Bangalore (IN); Swamim Narayan, Bangalore (IN); Kiran Rama, Bangalore (IN); Ivan Barrientos, Seattle, WA (US); Vijay Srinivas Agneeswaran, Bangalore (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 1056 days.

(21) Appl. No.: 17/804,429

(22) Filed: May 27, 2022

(65) Prior Publication Data

US 2023/0385612 A1     Nov. 30, 2023

(51) Int. Cl.
  *G06N 3/048*       (2023.01)
  *G06N 3/088*       (2023.01)
(52) U.S. Cl.
  CPC ............. *G06N 3/048* (2023.01); *G06N 3/088* (2013.01)
(58) Field of Classification Search
  CPC ............................... G06N 3/048; G06N 3/088
  See application file for complete search history.

(56) References Cited

U.S. PATENT DOCUMENTS

2020/0333767 A1* 10/2020 Engelstein ............... H04Q 9/00

OTHER PUBLICATIONS

Lai et al. "Modeling Long- and Short-Term Temporal Patterns with Deep Neural Networks", SIGIR, 2018, pp. 11, arXiv: 1703.07015v3 [cs.LG].*
Wu et al. "Adversarial Sparse Transformer for Time Series Forecasting", NeurTPS 2020, pp. 11.*
Huang et al. "Spatial-Temporal Convolutional Transformer Network for Multivariate Time Series Forecasting", sensors, Jan. 2022, p. 18.*
Zhao et al. "Handwritten mathematical expression recognition with bidirectionally trained transformer", https://arxiv.org/pdf/2105.02412, 2021, pp. 15 (Year: 2021).*

(Continued)

*Primary Examiner* — Li Wu Chang
(74) *Attorney, Agent, or Firm* — ArentFox Schiff LLP

(57)           ABSTRACT
Described are examples for generating a model for forecasting time series data. For a timeseries data set, one or more layers can be provided, where each layer in the one or more layers includes, for each timeseries data input in at least a portion of multiple timeseries data inputs, generating, for the timeseries data input, a short range output from a causal convolution process that is based on timeseries data inputs from the timeseries data set that are associated with timestamps within a threshold time before the timestamp of the timeseries data input, and generating, for the timeseries data input, a long range output from a transformer process based on the short range outputs from the causal convolution process for each timeseries data input from at least the portion of the multiple timeseries data inputs that are associated with timestamps before the timestamp of the timeseries data input.

11 Claims, 5 Drawing Sheets

(56) References Cited

OTHER PUBLICATIONS

"Autoregressive integrated moving average", Retrieved From: https://web.archive.org/web/20220501100448/https://en.wikipedia.org/wiki/Autoregressive_integrated_moving_average, May 1, 2022, 8 Pages.

"DeepAR Forecasting Algorithm", Retrieved From: https://docs.aws.amazon.com/sagemaker/latest/dg/deepar.html, Mar. 7, 2022, 7 Pages.

"Interpretable Deep Learning for Time Series Forecasting", Retrieved From: https://ai.googleblog.com/2021/12/interpretable-deep-learning-for-time.html, Dec. 13, 2021, 6 Pages.

"UCI Machine Learning Repository: ElectricityLoadDiagrams20112014 Data Set", Retrieved From: https://web.archive.org/web/20220325075019/https://archive.ics.uci.edu/ml/datasets/ElectricityLoadDiagrams20112014, Mar. 25, 2022, 2 Pages.

"UCI Machine Learning Repository: PEMS-SF Data Set", Retrieved From: https://web.archive.org/web/20220325075146/http://archive.ics.uci.edu/ml/datasets/PEMS-SF, Mar. 25, 2022, 2 Pages.

Ba, et al., "Layer Normalization", In Repository of arXiv:1607.06450v1, Jul. 21, 2016, 14 Pages.

Devlin, et al., "BERT: Pre-training of Deep Bidirectional Transformers for Language Understanding", In Repository of arXiv:1810.04805v1, Oct. 11, 2018, 14 Pages.

Germain, et al., "MADE: Masked Autoencoder for Distribution Estimation", In Proceedings of the 32nd International Conference on Machine Learning, Jun. 1, 2015, 9 Pages.

Huang, et al., "Neural autoregressive flows", In Proceedings of the 35th International Conference on Machine Learning, Jul. 3, 2018, 10 Pages.

Khandelwal, et al., "Sharp nearby, fuzzy far away: How neural language models use context", In Repository of arXiv:1805.04623v1, May 12, 2018, 14 Pages.

Kingma, et al., "Improved variational inference with inverse autoregressive flow", In Proceedings of 30th Conference on Neural Information Processing Systems, vol. 29, Dec. 5, 2016, 9 Pages.

Krishna, et al., "Hyper-parameter optimization with REINFORCE and Masked Attention Auto-regressive Density Estimators", In Proceedings of IEEE International Conference on Big Data, Dec. 10, 2020, pp. 5108-5117.

Li, et al., "Enhancing the locality and breaking the memory bottleneck of transformer on time seriesforecasting", In Journal of Advances in Neural Information Processing Systems, vol. 32, Dec. 8, 2019, pp. 1-11.

Lim, et al., "Temporal Fusion Transformers for interpretable multi-horizon time series forecasting", In International Journal of Forecasting, vol. 37, Issue 4, Oct. 1, 2021, pp. 1748-1764.

Oord, et al., "Conditional image generation with PixelCNN decoders", In Proceedings of 30th Conference on Neural Information Processing Systems, Dec. 5, 2016, pp. 1-9.

Oord, et al., "WaveNet: A Generative Model for Raw Audio", In Repository of arXiv:1609.03499, Sep. 19, 2016, 15 Pages.

Papamakarios, et al., "Masked Autoregressive Flow for Density Estimation", In Proceedings of 30th Conference on Neural Information Processing Systems, Dec. 4, 2017, 10 Pages.

Radford, et al., "Improving Language Understanding by Generative Pre-Training", In Technical Report, OpenAI, Jun. 11, 2018, 12 Pages.

Rangapuram, et al., "Deep State Space Models for Time Series Forecasting", In Proceedings of Advances in Neural Information Processing Systems, vol. 31, Dec. 3, 2018, 10 Pages.

Rezende, et al., "Variational Inference with Normalizing Flows", In Proceedings of the 32nd International Conference on Machine Learning, Jul. 6, 2015, 9 Pages.

Salinas, et al., "DeepAR: Probabilistic forecasting with autoregressive recurrent networks", In journal of International Journal of Forecasting, vol. 36, Issue 3, Jul. 1, 2020, pp. 1181-1191.

Srivastava, et al., "Highway networks", In Repository of arXiv:1505.00387v2. Nov. 3, 2015, 6 Pages.

Stankeviciute, et al., "Conformal Time-series Forecasting", In Journal of Advances in Neural Information Processing Systems, vol. 34, Dec. 6, 2021, pp. 1-13.

Uria, et al., "Neural autoregressive distribution estimation", In Journal of Machine Learning Research, vol. 17, Jan. 1, 2016, pp. 7184-7220.

Vaswani, et al., "Attention is all you need", In Journal of Advances in neural information processing systems, vol. 30, Dec. 4, 2017, pp. 1-11.

Wen, et al., "A multi-horizon quantile recurrent forecaster", In Repository of arXiv:1711.11053v1, Nov. 29, 2017, 8 Pages.

Xu, et al., "Conformal prediction for dynamic time-series", In Repository of arXiv:2010.09107v12, Oct. 31, 2021, pp. 1-42.

Zhu, et al., "Deep and confident prediction for time series at uber", In Proceedings of IEEE International Conference on Data Mining Workshops, Nov. 18, 2017, pp. 103-110.

Chen, et al., "Learning from Multiple Time Series: A Deep Disentangled Approach to Diversified Time Series Forecasting", In Repository of arXiv:2111.04942v1, Nov. 9, 2021, 12 Pages.

Shen, et al., "TCCT: Tightly-Coupled Convolutional Transformer on Time Series Forecasting", In Journal of Neurocomputing, vol. 480, Jan. 21, 2022, pp. 131-145.

"International Search Report and Written Opinion Issued in PCT Application No. PCT/US23/018233", Mailed Date: Jun. 26, 2023, 11 Pages.

Rae, et al., "Compressive Transformers for Long-Range Sequence Modelling", In Repository of arXiv:1911.05507v1, Nov. 13, 2019, 19 Pages.

* cited by examiner

200

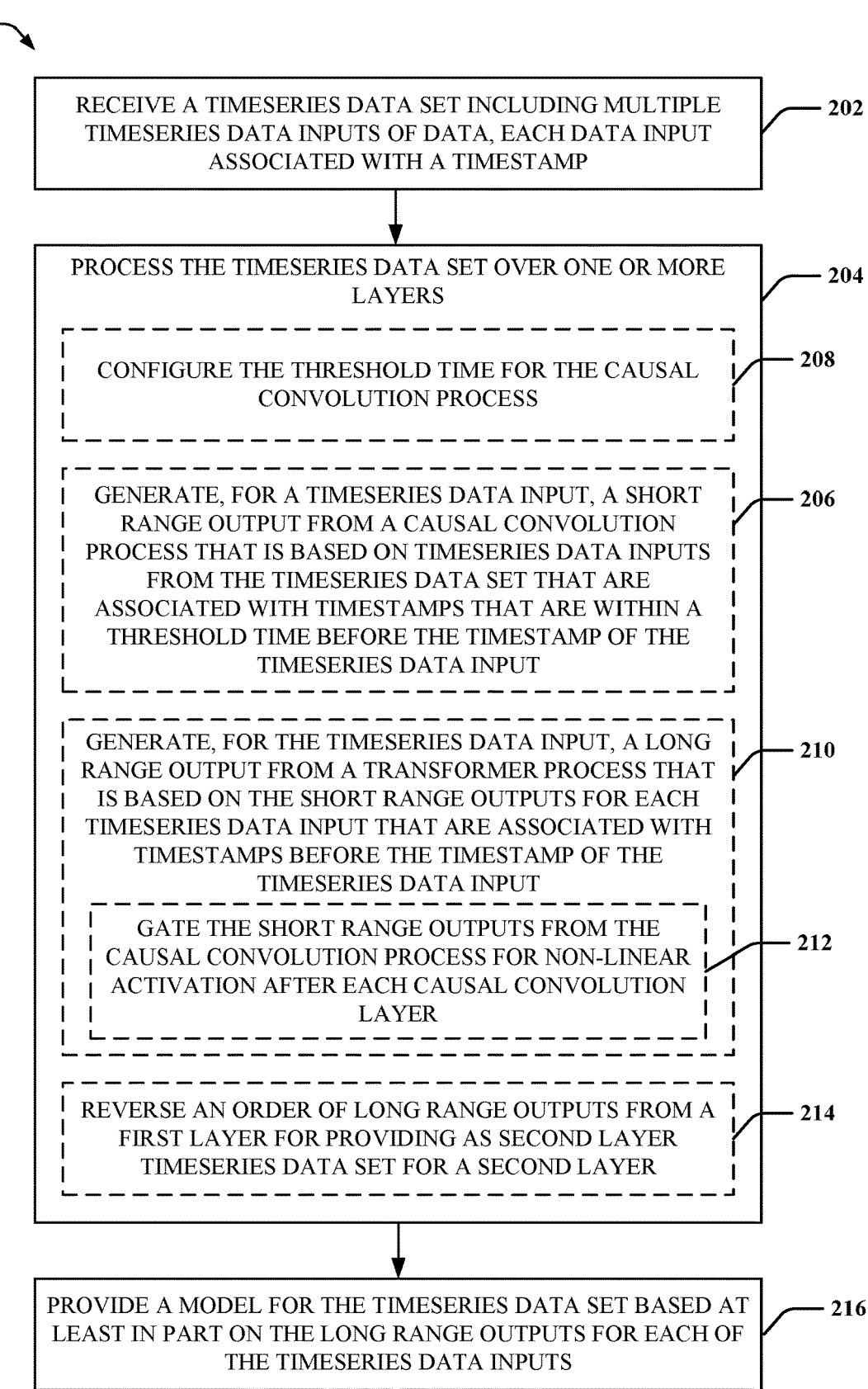

RECEIVE A TIMESERIES DATA SET INCLUDING MULTIPLE TIMESERIES DATA INPUTS OF DATA, EACH DATA INPUT ASSOCIATED WITH A TIMESTAMP — 202

PROCESS THE TIMESERIES DATA SET OVER ONE OR MORE LAYERS — 204

CONFIGURE THE THRESHOLD TIME FOR THE CAUSAL CONVOLUTION PROCESS — 208

GENERATE, FOR A TIMESERIES DATA INPUT, A SHORT RANGE OUTPUT FROM A CAUSAL CONVOLUTION PROCESS THAT IS BASED ON TIMESERIES DATA INPUTS FROM THE TIMESERIES DATA SET THAT ARE ASSOCIATED WITH TIMESTAMPS THAT ARE WITHIN A THRESHOLD TIME BEFORE THE TIMESTAMP OF THE TIMESERIES DATA INPUT — 206

GENERATE, FOR THE TIMESERIES DATA INPUT, A LONG RANGE OUTPUT FROM A TRANSFORMER PROCESS THAT IS BASED ON THE SHORT RANGE OUTPUTS FOR EACH TIMESERIES DATA INPUT THAT ARE ASSOCIATED WITH TIMESTAMPS BEFORE THE TIMESTAMP OF THE TIMESERIES DATA INPUT — 210

GATE THE SHORT RANGE OUTPUTS FROM THE CAUSAL CONVOLUTION PROCESS FOR NON-LINEAR ACTIVATION AFTER EACH CAUSAL CONVOLUTION LAYER — 212

REVERSE AN ORDER OF LONG RANGE OUTPUTS FROM A FIRST LAYER FOR PROVIDING AS SECOND LAYER TIMESERIES DATA SET FOR A SECOND LAYER — 214

PROVIDE A MODEL FOR THE TIMESERIES DATA SET BASED AT LEAST IN PART ON THE LONG RANGE OUTPUTS FOR EACH OF THE TIMESERIES DATA INPUTS — 216

Figure 2

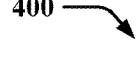
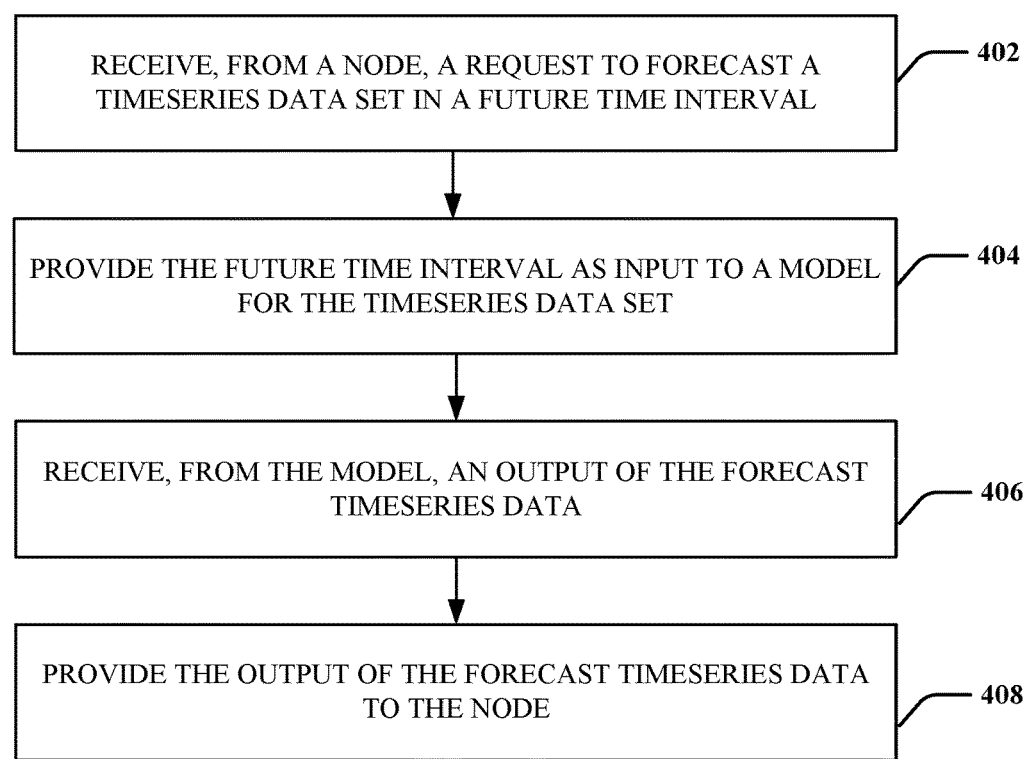
RECEIVE, FROM A NODE, A REQUEST TO FORECAST A TIMESERIES DATA SET IN A FUTURE TIME INTERVAL — 402
PROVIDE THE FUTURE TIME INTERVAL AS INPUT TO A MODEL FOR THE TIMESERIES DATA SET — 404
RECEIVE, FROM THE MODEL, AN OUTPUT OF THE FORECAST TIMESERIES DATA — 406
PROVIDE THE OUTPUT OF THE FORECAST TIMESERIES DATA TO THE NODE — 408
Figure 4

DEVICE 500

PROCESSOR 502

MEMORY 504

COMMUNICATIONS COMPONENT 506

DATA STORE 508

USER INTERFACE 510

FORECASTING COMPONENT 110

ML MODEL 120

FORECAST REQUESTING COMPONENT 126

TECHNIQUES FOR USING MULTIPLE NEURAL AUTOREGRESSIVE FLOW MODEL LAYERS TO GENERATE A MODEL FOR TIMESERIES DATA FORECASTING

BACKGROUND

Forecasting systems play a key role in business planning and data driven automated decision-making with applications in scheduling, budgeting, inventory and operations management, supply chain optimization, anomaly detection, predictive maintenance etc. The forecasting systems can receive data over one or more historical time periods, and can accordingly model and predict values for the data in one or more future time periods. For instance, a common use case can include, based on consumption and usage data received over a historical time period, forecasting the volume of consumption and usage across a large number of customer accounts. Traditional timeseries models fit individual models to each timeseries, and thus may not scale well to such scenarios. Some neural network models have been provided and use a common set of parameters to learn a global model across all these time-series. Some of these models, however, may only use a Gaussian density function, which may limit the overall expressivity of the model. Other such models may only estimate quantiles of interest, which may not produce well-calibrated confidence intervals, and may be limited to the quantiles specified during training. In some models, parametric space and complexity of the architecture used for modeling may increase with the number of dimensions, and thus may be unsuitable for modeling timeseries data over a long range.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an example, a computer-implemented method for generating a model for forecasting time series data is provided that includes receiving a timeseries data set including multiple timeseries data inputs of data, each data associated with a timestamp, and processing the timeseries data set over one or more layers, where each layer in the one or more layers includes, for each timeseries data input in at least a portion of the multiple timeseries data inputs, generating, for the timeseries data input, a short range output from a causal convolution process that is based on timeseries data inputs from the timeseries data set that are associated with timestamps that are within a threshold time before the timestamp of the timeseries data input, and generating, for the timeseries data input, a long range output from a transformer process that is based on the short range outputs from the causal convolution process for each timeseries data input from at least the portion of the multiple timeseries data inputs that are associated with timestamps before the timestamp of the timeseries data input. The method also includes providing a model for the timeseries data set based at least in part on the long range outputs for each of the timeseries data inputs.

In another example, a device for generating a model for forecasting time series data is provided that includes a memory storing instructions, and at least one processor coupled to the memory. The at least one processor is configured to receive a timeseries data set including multiple timeseries data inputs of data, each data associated with a timestamp, and process the timeseries data set over one or more layers, where each layer in the one or more layers includes, for each timeseries data input in at least a portion of the multiple timeseries data inputs, generating, for the timeseries data input, a short range output from a causal convolution process that is based on timeseries data inputs from the timeseries data set that are associated with timestamps that are within a threshold time before the timestamp of the timeseries data input, and generating, for the timeseries data input, a long range output from a transformer process that is based on the short range outputs from the causal convolution process for each timeseries data input from at least the portion of the multiple timeseries data inputs that are associated with timestamps before the timestamp of the timeseries data input. The at least one processor is further configured to provide a model for the timeseries data set based at least in part on the long range outputs for each of the timeseries data inputs.

In another example, a computer-readable device is provided that stores instructions thereon that, when executed by at least one computing device, causes the at least one computing device to perform operations for generating a model for forecasting time series data. The operations include receiving a timeseries data set including multiple timeseries data inputs of data, each data associated with a timestamp, and processing the timeseries data set over one or more layers, where each layer in the one or more layers includes, for each timeseries data input in at least a portion of the multiple timeseries data inputs, generating, for the timeseries data input, a short range output from a causal convolution process that is based on timeseries data inputs from the timeseries data set that are associated with timestamps that are within a threshold time before the timestamp of the timeseries data input, and generating, for the timeseries data input, a long range output from a transformer process that is based on the short range outputs from the causal convolution process for each timeseries data input from at least the portion of the multiple timeseries data inputs that are associated with timestamps before the timestamp of the timeseries data input. The operations also include providing a model for the timeseries data set based at least in part on the long range outputs for each of the timeseries data inputs.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2 is a flow diagram of an example of a method for providing a model for a timeseries data set, in accordance with aspects described herein.

FIG. 4 is a flow diagram of an example of a method for using a model trained as an affine autoregressive flow for a timeseries data set for forecasting data, in accordance with aspects described herein.

DETAILED DESCRIPTION

Figure 1:
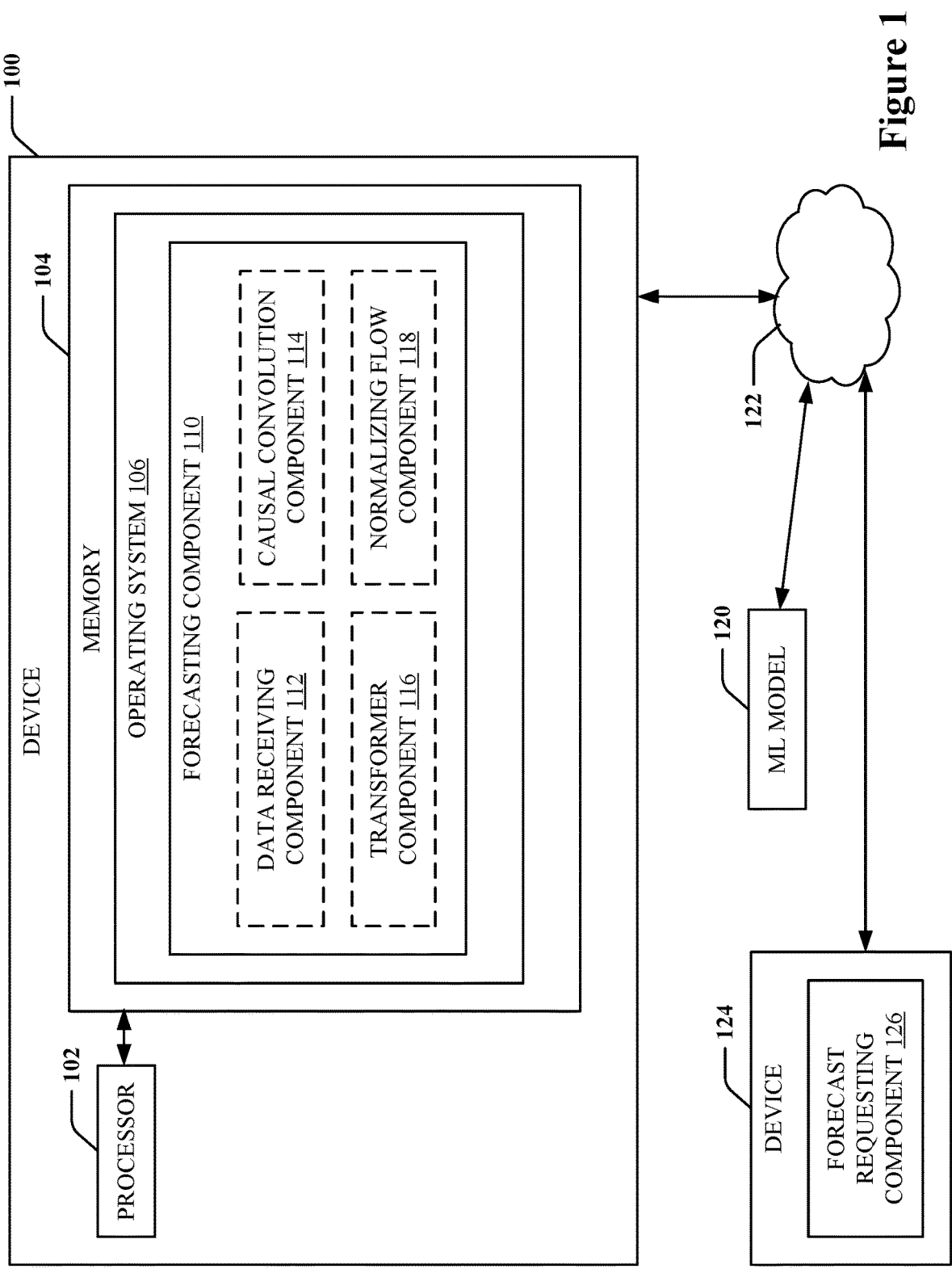
FIG. 1 is a schematic diagram of an example of a device for performing functions related to forecasting timeseries data and/or setting up a model that can forecast data based on timeseries data set input, in accordance with aspects described herein.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known components are shown in block diagram form in order to avoid obscuring such concepts.

This disclosure describes various examples related to generating a model for timeseries data forecasting. The model can be generated based on a timeseries data set for a historical time period. The model can use a neural network specified as a parametric normalizing flow and trained to learn distribution over a timeseries data set, which may be multi-modal or heavy-tailed at every time step or associated timestamp. For example, in timeseries modeling, a set of univariate timeseries data can be provided where each series T includes $$\{y_{i,1:T}\}_{i=1}^{M}$$

observations where $y_{i,t} \in \mathbb{R}$ can denote a continuous value observed at timestep t of timeseries i. There can also be potentially time-varying covariate vectors associated with each timeseries $$\{x_{i,1:T+H}\}_{i=1}^{M} \text{ with } x_{i,t} \in \mathbb{R}^{D}.$$

In probabilistic timeseries modeling, a distribution over values at each of the H next steps of a forecasting period can be learned, conditioned on the T historical observations and concomitant observable covariates by fitting a parametric density model $P_\theta(y_{i,T+1:T+H}|y_{i,1:T}, x_{i,1:T+H})$.

In addition to point estimates, uncertainty associated with the forecasts can also be of interest, which can facilitate planning under uncertainty and risk-aware decision making. To assess a model's ability to learn the underlying uncertainty, the following metrics can be defined. The calibration error associated with the model's estimate of the q-quantile, $$y_{T+h}^{(q)}$$

where $q \in [0,1]$ can be:

$$\left| \mathbb{E}\left[\mathbb{1}\left(y_{T+H} < y_{T+h}^{(q)}\right)\right] - q \right|.$$

The coverage error (gap between frequentist coverage and a confidence level of the model prediction interval can be:

$$\left| \mathbb{E}\left[\mathbb{1}\left(y_{T+H} \in \left(y_{T+h}^{q1}, y_{T+h}^{qu}\right)\right)\right] - |q_u - q_1| \right|.$$

The sharpness or average width of the model prediction interval, assuming it is well calibrated, can be:

$$\mathbb{E}\left[\left|y_{T+h}^{q\_u} - y_{T+h}^{q\_l}\right|\right].$$

Neural network-based models can yield good performance on such problems, where a common assumption can be that the timeseries data share statistical properties and can therefore be modeled using a shared set of parameters. Neural autoregressive models can fit a density model using an autoregressive factorization:

$$P_\theta(y_{T+1:T+H} \mid y_{1:T}) = \prod_{k=1}^{H} P_\theta(y_{T+k} \mid y_{1:T+k-1}).$$

Some such models can specify each conditional $P_\theta(y_{T+k}|y_{1:T+k-1})$ as a Gaussian for real-valued timeseries data with the mean and variance computed as a parametric function of previous timesteps. A shortcoming of this approach, as described, is that positing a known density function such as a Gaussian to model the conditional distributions constrains the overall expressivity of the density model. This can result in poorly calibrated models that over or under predict the target quantiles. Examples described herein provide normalizing flows that can attempt to learn complex multi-modal conditional distributions at each timestep without making any a priori assumptions about the properties of the distribution.

In an example, the model generated, used, and described herein, can be a deep autoregressive flow model including multiple neural autoregressive flow model layers that can be stacked to establish a composite affine autoregressive flow. For example, each neural autoregressive flow model layer in the stack can include multiple processes, such as a causal convolution process of dilated causal convolution layers to capture short range (or "local") dependencies in the timeseries data set and a transformer process that can implement a multi-headed self-attention operation for capturing long range dependencies in the timeseries data set. In an example, the causal convolution process can have a configurable field size of data from the data set to be included in the process. In addition, for example, data output at each layer (or one or more layers) in the stack can be reversed for input into a next layer, which can improve the expressivity or exclusivity of the model by learning more than just one type of distribution.

In this regard, the model can be generated to provide more accurate forecasts with improvement in calibrated prediction intervals. The model can be trained on large amounts of individual timeseries data to generate forecasts using the deep autoregressive flow model described above. When
provided a sequence of historical observations (e.g., histori-
cal timeseries data), for example, the model can generate
one or more probabilistic forecasts for timesteps in a fore-
casting period. The model described herein can learn a true
distribution at each step in the forecasting, which may be
multi-modal or heavy-tailed, without making any simplify-
ing assumptions as to the distribution. The model described
herein can accordingly be useful for planners who are
interested in probabilistic forecasts to drive decision making
in the face of uncertainty by generating accurate point
estimates and/or well-calibrated prediction intervals.

Turning now to FIGS. 1-5, examples are depicted with
reference to one or more components and one or more
methods that may perform the actions or operations
described herein, where components and/or actions/opera-
tions in dashed line may be optional. Although the opera-
tions described below in FIGS. 2 and 4 are presented in a
particular order and/or as being performed by an example
component, the ordering of the actions and the components
performing the actions may be varied, in some examples,
depending on the implementation. Moreover, in some
examples, one or more of the actions, functions, and/or
described components may be performed by a specially-
programmed processor, a processor executing specially-
programmed software or computer-readable media, or by
any other combination of a hardware component and/or a
software component capable of performing the described
actions or functions.

FIG. 1 is a schematic diagram of an example of a device
100 (e.g., a computing device) for performing functions
related to forecasting timeseries data and/or setting up a
model that can forecast data based on timeseries data set
input. In an example, device 100 can include a processor 102
and/or memory 104 configured to execute or store instruc-
tions or other parameters related to providing an operating
system 106, which can execute one or more applications or
processes, such as, but not limited to, a forecasting compo-
nent 110 for forecasting data based on timeseries data set
input or for generating the model that can facilitate fore-
casting the data. For example, processor 102 and memory
104 may be separate components communicatively coupled
by a bus (e.g., on a motherboard or other portion of a
computing device, on an integrated circuit, such as a system
on a chip (SoC), etc.), components integrated within one
another (e.g., processor 102 can include the memory 104 as
an on-board component), and/or the like. Memory 104 may
store instructions, parameters, data structures, etc. for use/
execution by processor 102 to perform functions described
herein.

For example, forecasting component 110 can include a
data receiving component 112 for receiving a timeseries data
set including data received or recorded over multiple time
instances, where each data input can be associated with a
timestamp, a causal convolution component 114 for per-
forming a causal convolution process on the data such that
for each data input, the causal convolution process can
consider other data inputs within a short range timespan of
the given data input, a transformer component 116 for
performing a transformer process on the output of the causal
convolution process for a larger set of data inputs within a
long range timespan of the given data input, and/or a
normalizing flow component 118 for stacking multiple lay-
ers of the causal convolution process and the transformer
process to refine an output corresponding to a timeseries
data input. In an example, the output can be used to provide
a ML model 120 for forecasting timeseries data, where the ML model 120 can also be part of device 100 or otherwise
accessible by the device 100 (e.g., via one or more networks
122, as shown). In addition, in an example, a device 124 can
communicate with device 100 via one or more networks
122, and can include a forecast requesting component 126
for requesting, and/or receiving, forecast data for a future
time period from the device 100.

FIG. 2 is a flowchart of an example of a method 200 for
providing a model for a timeseries data set. For example,
method 200 can be performed by a device 100 and/or one or
more components thereof to facilitate generating or other-
wise providing the model based on the timeseries data set.

For example, normalizing flows can provide for learning
more expressive multi-modal parametric density functions
$P_\theta(y_{T+1:T+H}|y_{1:T})$ from the data. To do so, an invertible
parameterized mapping can be defined: $f_\theta: \mathbb{R}^{T+H} \to \mathbb{R}^{T+H}$,
which can be referred to as a flow. If a base density function
$P_u(u_{1:T+H})$ is posited that can be evaluated on any $u_{1:T+H} \in \mathbb{R}^{T+H}$ and sampled from, such as an isotropic Gaussian,
then the density function for the distribution induced over $$y_{1:T+H} = f_\theta^{-1}(u_{1:T+H})$$

for $u_{1:T+H} \sim P_U(u_{1:T+H})$ can be:

$$P_\theta(y_{1:T+H}) = P_U(f_\theta(y_{1:T+H}))\left|\det\left(\frac{\delta f_\theta}{\delta y_{1:T+H}}\right)\right|.$$

The flow can be specified such that the determinant of the
Jacobian and the inverse flow can be easily computed. Affine
autoregressive flows can provide for specifying such trac-
table flow. One possible affine autoregressive flow can be
defined with a flow layer, $$k, u_{1:T+H}^{k+1} = (f_{\theta^k})(u_{1:T+H}^k)$$

such that:

$$u_{t+1}^{k+1} = (u_{t+1}^k - \mu_t^k)\exp(-\alpha_t^k).$$

In this example, $$\mu_t^k, \sigma_t^k$$

can be computed as affine transformations of the context
representation.

$$\mu_t^k \in \mathbb{R} = W_\mu^k h_{\phi^k}(u_{1:t}^k) + b_\mu^k$$
$$\alpha_r^k \in \mathbb{R} = W_\alpha^k h_{\phi^k}(u_{1:t}^k) + b_\alpha^k$$

In this example, $h_{\phi^k}(.) \in \mathbb{R}$ can be the context representa-
tion computed from previous values using the transformer
process described above and herein. In an example, $$\theta^k = \{\varnothing^k, W_\mu^k, W_\alpha^k, b_\mu^k, b_\alpha^k\}$$

can be a set of learnable parameters in flow layer k. In examples described herein, K layers can be stacked to establish the composite normalizing flow:

$$f_\theta(y_{1:T+H}) = u_{1:T+H}^{(K+1)} = f_{\theta^{(K)}} \circ f_{\theta^{(K-1)}} \circ \ldots \circ f_{\theta^1}\left(u_{1:T+H}^{(1)}\right) \qquad \text{Eq (1)}$$

where $$u_{1:T+H}^{(1)} = y_{1:T+H}. \qquad (1)$$

The conditional log-likelihood of values in the forecasting period can be specified by the flow as:

$$\log P_\theta(y_{T+1:T+H} \mid y_{1:T}) = \log P_U\left(u_{>T}^{(k+1)}\right) + \sum_{k=1}^{K} \log\left|\det\left(\frac{\delta u_{>T}^{(k+1)}}{\delta u_{>T}^{(k)}}\right)\right|$$

where $$\left|\det\left(\frac{\delta u_{>T}^{(k+1)}}{\delta u_{>T}^{(k)}}\right)\right| = \exp\left(-\sum_{t>T} \alpha_t^k\right).$$

The log-likelihood $\Sigma_i \log P_\theta(y_{i,T+1:T}|y_{i,1:T})$ can be maximized with respect to $\theta$ over samples $\{y_{i,1:T+H}\}$ drawn from the timeseries data. This can be similar (or equivalent) to stochastically minimizing the KL-divergence between the empirical distribution induced by applying the reverse flow over the timeseries observations:

$$\hat{P}(.) = \frac{1}{M} \sum_{i=1}^{M} 1\{u_{i,T+1:T+H} = (.)\}$$

where $$u_{i,T+1:T+H} = f_\theta^{-1}(y_{i,T+1:T+H}),$$

and the base distribution $P_U(.)$.

While log-likelihood terms in $P_\theta(y_{T+1:T+H}|y_{1:T})$ can be computed in parallel, sampling trajectories can be a sequential operation. In one example, to sample, $y_{T+1:T+H} \sim P_\theta((y_{T+1:T+H}|y_{1:T}))$, a procedure similar to the following can be executed:

| | |
|---|---|
| 1. | Set $u_{1:T}^{(1)} = y_{1:T}$. |
| | Compute and cache: |
| | $u_{1:T}^{(2)} = f_{\theta^1}(u_{1:T}^{(1)}), u_{1:T}^{(3)} =$ |
| | $f_{\theta^2}(u_{1:T}^{(2)}), \ldots, (u_{1:T}^{(K+1)}) =$ |
| | $f_{\theta^K}(u_{1:T}^{(K)})$ using Eq. (1) above. |
| 2. | Sample $u_{T+1:T+H}^{(K+1)}$ from an H dimensional isotropic Gaussian, |
| | $\mathcal{N}(.; 0, I)$ |
| 3. | For k = K to 1 |
| | For t = T + 1 to T + H |
| | Compute $u_t^{(k)} = u_t^{(k+1)} \exp(\alpha_{t-1}^{(k+1)} + \mu_{t-1}^{(k+1)}$ |
| 4. | Return $y_{T+1:T+H} = u_{T+1:T+H}^{(1)}$ |

The time complexity of sampling a trajectory under this procedure can be $\theta(NH)$.

In method 200, at action 202, a timeseries data set including multiple data inputs of data can be received, where each data input is associated with a timestamp. In an example, data receiving component 112 of a forecasting component 110, e.g., in conjunction with processor 102, memory 104, operating system 106, etc., can receive the timeseries data set including the multiple timeseries data inputs of data, each data input associated with a timestamp. For example, data receiving component 112 can receive the data from one or more data sources, such as one or more other devices (e.g., device 124 or other devices), one or more data stores (not shown), etc., where the data can include data that is recorded from a system as occurring in different time instances and associated with a timestamp indicating the time instance for the data. For example, the timeseries data set can include substantially any data that is recorded in a timeseries such to facilitate predicting future data in a future time period. Specific examples of a timeseries data set can include network throughput or traffic data, product or service purchase data, product or service consumption data, financial data, budgeting data, weather-related data, logistics data, etc. In an example, the timeseries data set can be used to forecast data for various purposes, as described above, such as scheduling, budgeting, inventory and operations management, supply chain optimization, anomaly detection, predictive maintenance, etc.

In method 200, at action 204, the timeseries data set can be processed over one or more layers. In an example, forecasting component 110, or one or more components thereof, e.g., in conjunction with processor 102, memory 104, operating system 106, etc., can process the timeseries data set over the one or more layers. For example, the one or more layers may each include a set of one or more similar or different processes used to process the timeseries data, and the output thereof can be provided to, or as, a model for the timeseries data set, and/or used to forecast values for the data in one or more future time periods.

In processing the data at action 204, optionally at action 206, a short range output can be generated, for a timeseries data input, from a causal convolution process that is based on timeseries data inputs from the timeseries data set that are associated with timestamps that are within a threshold time before the timestamp of the timeseries data input. In an example, causal convolution component 114, e.g., in conjunction with processor 102, memory 104, operating system 106, etc., can generate, for the timeseries data input, the short range output from the causal convolution process that is based on timeseries data inputs associated with timestamps that are within a threshold time before the timestamp of the timeseries data input. In an example, causal convolution component 114 can perform this causal convolution process for each of multiple timeseries data inputs in the timeseries data set (e.g., where the timeseries data inputs have at least one other timeseries data input in the timeseries data set with an earlier timestamp). To provide the short range output, however, causal convolution process can consider, for a given timeseries data input, only the prior timeseries data inputs that are within a threshold timestamp before the given timeseries data input or are within a threshold number of inputs (or field size) from the given timeseries data input.

In one example, causal convolution component 114 can use a process such as a masked autoencoder for distribution estimation (MADE) (described in M Germain et al., "MADE: Masked autoencoder for distribution estimation," International Conference on Machine Learning, 2015), a generative model for raw audio (described in A. v. d. Oord, et al. "Wavenet: A generative model for raw audio," arXiv preprint arXiv:1603.03499, 2016), and/or the like. In such processes, the parametric and space complexity may increase with sequence length, and thus using the process for short range dependencies can improve performance of the model as opposed to using the process for all dependencies timeseries data set. In this regard, as described above and further herein, a different process can be used to model long range dependencies in the timeseries data set.

In one example of processing the data at action 204, optionally at action 208, the threshold time for the causal convolution process can be configured. In an example, causal convolution component 114, e.g., in conjunction with processor 102, memory 104, operating system 106, etc., can configure, or can allow or cause configuration of, the threshold time for the causal convolution process. In this regard, for example, the range size for the short range (e.g., the field size) of timeseries data inputs to consider in performing the causal convolution process for a given timeseries data input can be configurable. Thus, for example, causal convolution component 114 can configure the number of short range values, or associated timespan, to be modeled to achieve a certain performance metric for the model or otherwise balance sequence modeling capacity with computation constraints such as model parametric and space complexity, parallelizability (e.g., measured by the number of sequential operations), path length (e.g., defined as the number of steps the signal traverses to capture dependency over a certain length), etc. Configuring the threshold time or field size, for example, can allow for encoding local dependencies based on one or more other parameter values, such as a kernel size, a number of causal convolution layers, or a dilation factor.

In processing the data at action 204, optionally at action 210, a long range output can be generated, for a timeseries data input, from a transformer process that is based on timeseries data inputs that are associated with timestamps before the timestamp of the timeseries data input. In an example, transformer component 116, e.g., in conjunction with processor 102, memory 104, operating system 106, etc., can generate, for the timeseries data input, the long range output from a transformer process that is based on timeseries data inputs that are associated with timestamps before the timestamp of the timeseries data input. For example, for a given timeseries data input, the short range outputs of the causal convolution process described above can be considered for a set of timeseries data inputs over a larger range that for the causal convolution process. In one example, transformer component 116 can consider, for a given timeseries data input, the short range outputs from the causal convolution process for all of the timeseries data inputs that have a timestamp before the timestamp of the given timeseries data input. In an example, as described above and further herein, the transformer process performed by the transformer component 116 can include a multi-headed self-attention operation to learn the long range dependencies between the various inputs of the timeseries data set. In one example, transformer component 116 may similarly use a recurrent neural network (RNN), instead of a transformer, to generate the long range outputs.

In one example of generating the long range output at action 210, optionally at action 212, the short range outputs from the causal convolution process can be gated for non-linear activation after each causal convolution layer. In an example, transformer component 116, e.g., in conjunction with processor 102, memory 104, operating system 106, etc., can gate the short range outputs from the causal convolution process for non-linear activation after each causal convolution layer, which can stabilize training and/or improve model performance.

In an example, normalizing flow component 118 can perform the above processes multiple times. This can include providing (or stacking) multiple layers, as described, where each layer can perform the causal convolution process and the transformer process, and the output of one layer can be used as input to the next layer for a configured number of layers. Each layer can be a neural-autoregressive model, as described above. By stacking the layers in this regard, for example, normalizing flow component 118 can setup an affine autoregressive flow.

In processing the data at action 204, optionally at action 214, an order of long range outputs from a first layer can be reversed for providing as a second layer timeseries data set for a second layer. In an example, normalizing flow component 118 of the forecasting component 110, e.g., in conjunction with processor 102, memory 104, operating system 106, etc., can reverse the order of the long range outputs from the first layer for providing as second layer timeseries data set for the second layer. In one example, normalizing flow component 118 can reverse the order of the values output from the transformer process at each layer for providing as input values to the causal convolution process of the next layer. By reversing the order of values at each layer, for example, the model can be capable of learning expressive density functions across all timesteps in the forecasting period. In this regard, the model can learn complex multi-modal distributions, which can improve exclusivity and/or expressivity of the model.

In method 200, at action 216, a model for the timeseries data set can be provided based at least in part on the long range outputs for each of the timeseries data inputs. In an example, forecasting component 110, or one or more components thereof, e.g., in conjunction with processor 102, memory 104, operating system 106, etc., can provide the model (e.g., ML model 120) for the timeseries data set based at least in part on the long range outputs for each of the timeseries data inputs. Accordingly, the ML model 120 can be trained as described above to model short range dependencies and long range dependencies, which can result in learning true underlying distributions (which may be multi-modal or heavy-tailed), while also improve exclusivity of the model, which can provide more accurate forecasting for the underlying data in future time periods.

Figure 3:
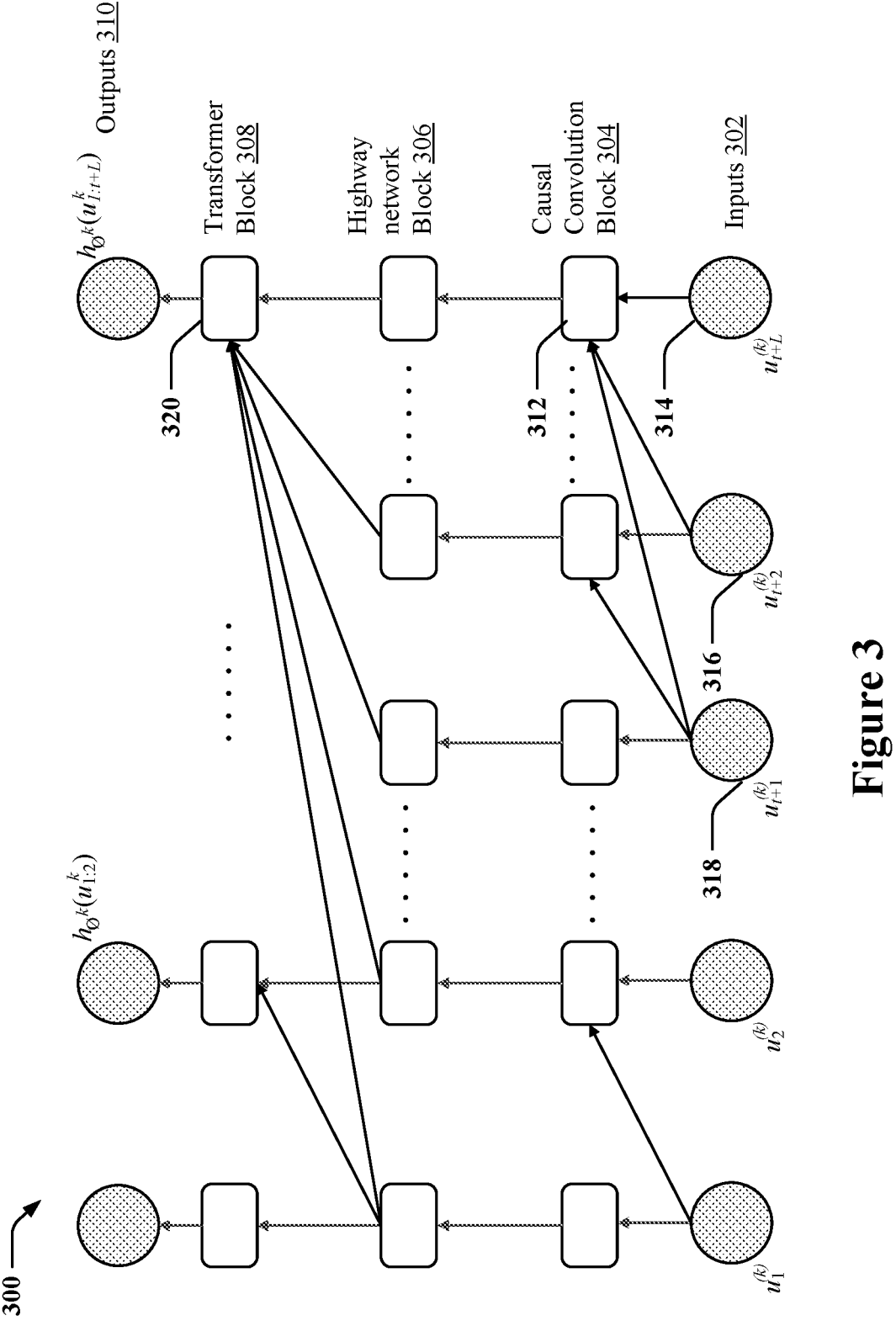
FIG. 3 illustrates an example of a flow layer, which may be one neural-autoregressive model, in an affine autoregressive flow, in accordance with aspects described herein.

FIG. 3 illustrates an example of a flow layer 300, which may be one neural-autoregressive model, in an affine autoregressive flow, in accordance with aspects described herein. Flow layer 300 includes a set of inputs 302, which may be the timeseries data set or outputs from a previous layer of the affine autoregressive flow. The set of inputs 302 can be provided (e.g., by data receiving component 112) to a causal convolution block 304 (e.g., the causal convolution process provided by causal convolution component 114). The outputs of the causal convolution block 304 can be provided to a highway network block 306 (e.g., the gating process provided by transformer component 116) to provide non-linear dependencies across timestamps. The outputs of the highway network block 306 can be provided to a transformer block 308 (e.g., the transformer process provided by transformer component 116). The outputs 310 of the transformer block 308 can be provided to a next layer in the affine autoregressive flow or as output to the ML model (e.g., ML model 120).

For example, as described, the causal convolution block 304 can process shorter range dependencies, which is shown where causal convolution process 312 in the causal convolution block 304 considers inputs 314, 316, 318, but not other inputs. As described, for example, causal convolution component 114 can up-sample the sequence of scalar inputs to the causal convolution block 304, $u_{1:T+H}^{(k)}$, to D dimensional embeddings using one dimensional convolution followed by the addition of positional encoding based on the original temporal sequence. Where causal convolution component 114 uses Wavenet, for example, residual and skip connections and a gating function can be used for non-linear activation after each convolution layer to stabilize training and improve model performance. In an example, the causal convolution component 114 can provide, for each layer of the affine autoregression flow (e.g., in a given causal convolution block 304), multiple causal convolution layers. For example, the each hidden layer can receive a number of inputs according to a configurable kernel size and can provide a number of outputs according to a dilation factor.

The transformer block 308 can process longer range dependencies, which is shown where transformer process 320 in transformer block 308 considers all previous outputs of causal convolution block 304 (or as possibly gated by the highway network block 306). The highway network block 306 can act as a bridge between the transformer block 308 and the causal convolution block 304. In an example, transformer component 116 can provide the gating functionality for the highway network block 306 using a gated-activation function followed by a residual connection, such as:

$$z'_{1:T+H} = \mathrm{Dropout}(z_{1:T+H}) + \tanh(W_f * z_{1:T+H}) \odot \sigma(W_g * z_{1:T+H})$$

As described, the transformer block 308 can include a multi-headed self-attention layer, which may correspond to a decoder followed by a position-wise feed-forward layer (e.g., as described in A. Vaswani, et al., "Attention is all you need," Advances in neural information processing systems, vol. 30, 2017). Transformer component 116 can apply dropout to the input to each layer and add to the layer output. Transformer component 116 can normalize the layer to compute the final output.

FIG. 4 is a flowchart of an example of a method 400 for using a model trained as an affine autoregressive flow for a timeseries data set for forecasting data. For example, method 400 can be performed by a device 124 and/or one or more components thereof to facilitate forecasting data using the model.

In method 400, at action 402, a request to forecast a timeseries data set in a future time interval can be received. In an example, forecasting component 110, e.g., in conjunction with processor 102, memory 104, operating system 106, etc., can receive, from the node (e.g., from a forecast requesting component 126 of another device 124), the request to forecast the timeseries data set in the future time interval. In an example, the request can include an indication of the desired time interval in the future.

In method 400, at action 404, the future time interval can be provided as input to a model for the timeseries data set. In an example, forecasting component 110, e.g., in conjunction with processor 102, memory 104, operating system 106, etc., can provide the future time interval (or some indication thereof) as input to the model (e.g., ML model 120) for the timeseries data set. As described, for example, the model can be the affine autoregressive flow generated from the timeseries data set based on one or more processes described above, which may include multiple layers of causal convolution processes and transformer processes, etc.

In method 400, at action 406, an output of the forecast timeseries data can be received from the model. In an example, forecasting component 110, e.g., in conjunction with processor 102, memory 104, operating system 106, etc., can receive, from the model, the output of the forecast timeseries data. In one example, the model can generate the output based on one or more of the formulas, equations, or algorithms described above.

In method 400, at action 408, the output of the forecast timeseries data can be provided to the node. In an example, forecasting component 110, e.g., in conjunction with processor 102, memory 104, operating system 106, etc., can provide the output of the forecast timeseries data to the node (e.g., to forecast requesting component 126 of another device 124). For example, forecasting component 110 can provide the output in substantially any format, which may be specified by the requesting node or otherwise. For example, forecasting component 110 can provide the output as values associated with parameters, such as in database query results (e.g. in a query language, such as structured query language (SQL)), comma separated values, etc.

Figure 5:
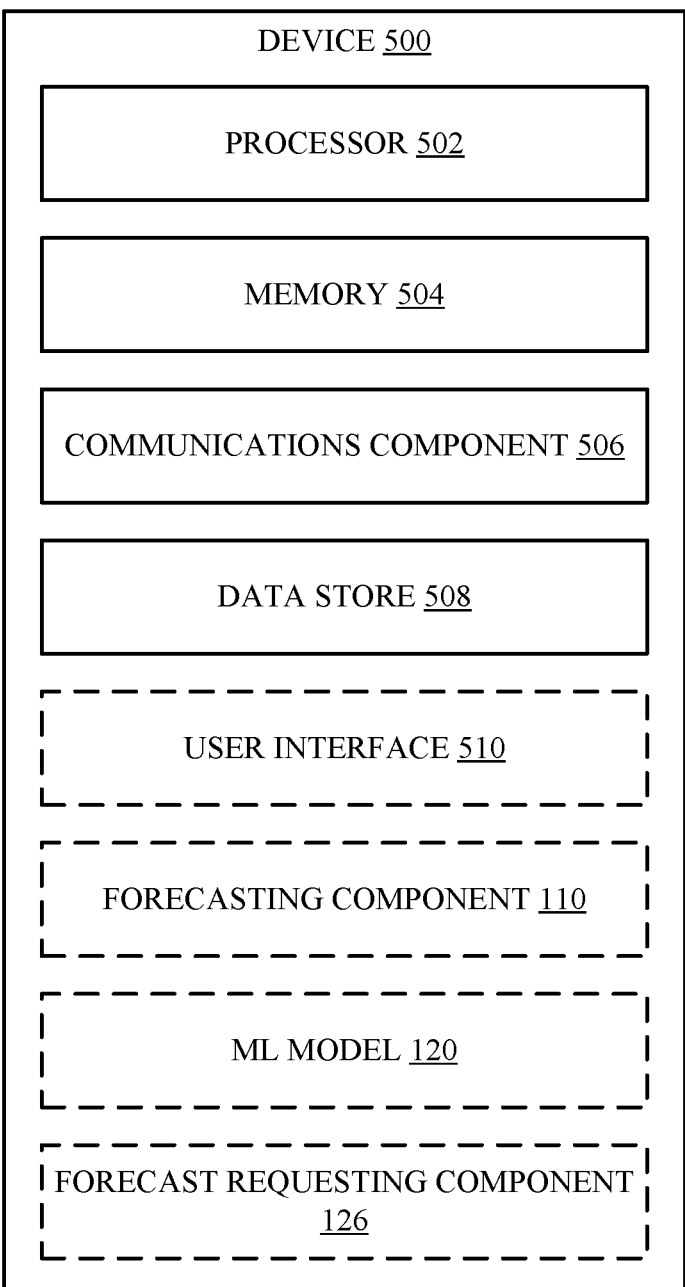
FIG. 5 is a schematic diagram of an example of a device for performing functions described herein, in accordance with aspects described herein.

FIG. 5 illustrates an example of device 500 including additional optional component details as those shown in FIG. 1. In one aspect, device 500 may include processor 502, which may be similar to processor 102 for carrying out processing functions associated with one or more of components and functions described herein. Processor 502 can include a single or multiple set of processors or multi-core processors. Moreover, processor 502 can be implemented as an integrated processing system and/or a distributed processing system.

Device 500 may further include memory 504, which may be similar to memory 104 such as for storing local versions of operating systems (or components thereof) and/or applications being executed by processor 502, such as a forecasting component 110, ML model 120, forecast requesting component 126, etc. Memory 504 can include a type of memory usable by a computer, such as random access memory (RAM), read only memory (ROM), tapes, magnetic discs, optical discs, volatile memory, non-volatile memory, and any combination thereof.

Further, device 500 may include a communications component 506 that provides for establishing and maintaining communications with one or more other devices, parties, entities, etc. utilizing hardware, software, and services as described herein. Communications component 506 may carry communications between components on device 500, as well as between device 500 and external devices, such as devices located across a communications network and/or devices serially or locally connected to device 500. For example, communications component 506 may include one or more buses, and may further include transmit chain components and receive chain components associated with a wireless or wired transmitter and receiver, respectively, operable for interfacing with external devices.

Additionally, device 500 may include a data store 508, which can be any suitable combination of hardware and/or software, that provides for mass storage of information, databases, and programs employed in connection with aspects described herein. For example, data store 508 may be or may include a data repository for operating systems (or components thereof), applications, related parameters, etc.) not currently being executed by processor 502. In addition, data store 508 may be a data repository for a forecasting component 110, ML model 120, forecast requesting component 126, and/or one or more other components of the device 500.

Device 500 may optionally include a user interface component 510 operable to receive inputs from a user of device 500 and further operable to generate outputs for presentation to the user. User interface component 510 may include one or more input devices, including but not limited to a keyboard, a number pad, a mouse, a touch-sensitive display, a navigation key, a function key, a microphone, a voice recognition component, a gesture recognition component, a depth sensor, a gaze tracking sensor, a switch/button, any other mechanism capable of receiving an input from a user, or any combination thereof. Further, user interface component 510 may include one or more output devices, including but not limited to a display, a speaker, a haptic feedback mechanism, a printer, any other mechanism capable of presenting an output to a user, or any combination thereof.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, one or more of the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described herein that are known or later come to be known to those of ordinary skill in the art are expressly included and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A computer-implemented method for generating a model for forecasting time series data, comprising:

receiving a timeseries data set including multiple timeseries data inputs of data, each data associated with a timestamp;

processing the timeseries data set using multiple neural autoregressive flow model layers, wherein the multiple neural autoregressive flow model layers include:

a first layer that generates, for the timeseries data input, a short range output from a causal convolution process, wherein the causal convolution process captures dependencies between timeseries data inputs from the timeseries data set that are associated with timestamps that are within a threshold time before the timestamp of the timeseries data input; and a second layer that generates, for the timeseries data input, a long range output from a transformer process, wherein the transformer process uses a multi-headed self-attention operation on the short range outputs from one or more instances of the first layer to learn long range dependencies for the timeseries data input, wherein each instance of the multiple instances of the first layer performs the causal convolution process for a given timeseries data input of the multiple timeseries data inputs, wherein the long range outputs from the second layer are layer normalized to provide the model for the timeseries data set, and wherein at least one instance of the second layer uses the transformer process on multiple outputs from multiple instances of the first layer;

reversing an order of the long range outputs from the second layer for providing as the second layer timeseries data set for input to the first layer; and providing a model for the timeseries data set based at least in part on the long range outputs for each of the timeseries data inputs.

2. The computer-implemented method of claim 1, further comprising configuring the threshold time for the causal convolution process based on a kernel size, a number of causal convolution layers, or a dilation factor.

3. The computer-implemented method of claim 1, wherein generating the long range output further includes gating the short range outputs from the causal convolution process for non-linear activation after each causal convolution layer.

4. The computer-implemented method of claim 1, further comprising:

receiving, from a node, a request to forecast the timeseries data set in a future time interval;

providing the future time interval as input into the model for the timeseries data set;

receiving, from the model, an output of the forecast timeseries data; and providing the output of the forecast timeseries data to the node.

5. A device for generating a model for forecasting time series data, comprising:

a memory storing instructions; and at least one processor coupled to the memory and configured to execute the instructions to:

receive a timeseries data set including multiple timeseries data inputs of data, each data associated with a timestamp;

process the timeseries data set using multiple neural autoregressive flow model layers, wherein the multiple neural autoregressive flow model layers include:

a first layer that generates, for the timeseries data input, a short range output from a causal convolution process, wherein the causal convolution process captures dependencies between timeseries data inputs from the timeseries data set that are associated with timestamps that are within a threshold time before the timestamp of the timeseries data input; and a second layer that generates, for the timeseries data input, a long range output from a transformer process, wherein the transformer process uses a multi-headed self-attention operation on the short range outputs from one or more instances of the first layer to learn long range dependencies for the timeseries data input, wherein each instance of the multiple instances of the first layer performs the causal convolution process for a given timeseries data input of the multiple timeseries data inputs, wherein the long range outputs from the second layer are layer normalized to provide the model for the timeseries data set, and wherein at least one instance of the second layer uses the transformer process on multiple outputs from multiple instances of the first layer;

reverse an order of the long range outputs from the second layer for providing as the second layer timeseries data set for input to the first layer; and provide a model for the timeseries data set based at least in part on the long range outputs for each of the timeseries data inputs.

6. The device of claim 5, wherein the at least one processor is configured to execute the instructions to configure the threshold time for the causal convolution process based on a kernel size, a number of causal convolution layers, or a dilation factor.

7. The device of claim 5, wherein the at least one processor is configured to execute the instructions to generate the long range output at least in part by gating the short range outputs from the causal convolution process for non-linear activation after each causal convolution layer.

8. The device of claim 5, wherein the at least one processor is configured to execute the instructions to:

receive, from a node, a request to forecast the timeseries data set in a future time interval;

provide the future time interval as input into the model for the timeseries data set;

receive, from the model, an output of the forecast timeseries data; and provide the output of the forecast timeseries data to the node.

9. A non-transitory computer-readable medium storing instructions thereon that, when executed by at least one computing device, causes the at least one computing device to perform operations for generating a model for forecasting time series data, comprising:

receiving a timeseries data set including multiple timeseries data inputs of data, each data associated with a timestamp;

processing the timeseries data set using multiple neural autoregressive flow model layers, wherein the multiple neural autoregressive flow model layers include:

a first layer that generates, for the timeseries data input, a short range output from a causal convolution process, wherein the causal convolution process captures dependencies between timeseries data inputs from the timeseries data set that are associated with timestamps that are within a threshold time before the timestamp of the timeseries data input; and a second layer that generates, for the timeseries data input, a long range output from a transformer process, wherein the transformer process uses a multi-headed self-attention operation on the short range outputs from one or more instances of the first layer to learn long range dependencies for the timeseries data input, wherein each instance of the multiple instances of the first layer performs the causal convolution process for a given timeseries data input of the multiple timeseries data inputs, wherein the long range outputs from the second layer are layer normalized to provide the model for the timeseries data set, and wherein at least one instance of the second layer uses the transformer process on multiple outputs from multiple instances of the first layer;

reversing an order of the long range outputs from the second layer for providing as the second layer timeseries data set for input to the first layer; and providing a model for the timeseries data set based at least in part on the long range outputs for each of the timeseries data inputs.

10. The non-transitory computer-readable medium of claim 9, wherein the operations further include configuring the threshold time for the causal convolution process based on a kernel size, a number of causal convolution layers, or a dilation factor.

11. The non-transitory computer-readable medium of claim 9, wherein the operations for generating the long range output include gating the short range outputs from the causal convolution process for non-linear activation after each causal convolution layer.

* * * * *